United States Patent
Ushiroguchi

(10) Patent No.: US 8,820,821 B2
(45) Date of Patent: Sep. 2, 2014

(54) OPERATING MACHINE

(71) Applicant: Kobelco Construction Machinery Co., Ltd., Hiroshima (JP)

(72) Inventor: Asuka Ushiroguchi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/647,635

(22) Filed: Oct. 9, 2012

(65) Prior Publication Data

US 2013/0093214 A1  Apr. 18, 2013

(30) Foreign Application Priority Data

Oct. 13, 2011 (JP) ................................. 2011-225986

(51) Int. Cl.
*E02F 9/10* (2006.01)
*E02F 9/08* (2006.01)
*E02F 9/22* (2006.01)

(52) U.S. Cl.
CPC ............ *E02F 9/0816* (2013.01); *E02F 9/2275* (2013.01)
USPC .................... 296/193.07; 296/204; 180/89.12; 180/312

(58) Field of Classification Search
CPC ............ B60R 13/0846; B60R 16/0215; B60R 16/0222; B62D 21/02; B62D 21/03; B62D 21/10; B62D 21/17; B62D 25/20; B62D 25/24; E02F 9/2275; E02F 9/0816; E02F 9/0808; E02F 9/0858

USPC ............... 296/187.08, 191, 192, 193.07, 204, 296/208; 180/89.1, 89.12, 312; 280/781
See application file for complete search history.

(56) References Cited

U.S. PATENT DOCUMENTS

| | | | |
|---|---|---|---|
| 7,318,469 B2* | 1/2008 | Hosokawa | 165/41 |
| 7,500,532 B2* | 3/2009 | Koga et al. | 180/89.13 |
| 7,781,678 B2* | 8/2010 | Reed et al. | 174/153 G |
| 2003/0015362 A1* | 1/2003 | Asche et al. | 180/89.12 |
| 2004/0222007 A1* | 11/2004 | Nakamrura | 174/65 G |

FOREIGN PATENT DOCUMENTS

| | | |
|---|---|---|
| JP | 2001-115487 | 4/2001 |
| JP | 2005-256569 | 9/2005 |

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

An operating machine comprises a machine body mounted on a lower propelling body. The machine body comprises an upper frame, and a line member mutually connecting a plurality of devices installed to the upper frame. The upper frame has a bottom plate, a pair of longitudinal plates each provided to stand on the bottom plate and extend in a front-rear direction, while being disposed in spaced-apart relation to each other in a right-left direction, and a transverse plate provided to stand on the bottom plate and extend in the right-left direction, while being joined to each of the longitudinal plates. A specific plate consisting of at least one of the pair of longitudinal plates and the transverse plate has an upper edge on which a pair of protrusions are provided in opposed relation to each other, and the line member is set to pass through between the pair of protrusions.

6 Claims, 10 Drawing Sheets

OPERATING MACHINE

BACKGROUND OF THE INVENTION

1. Field of the Invention

The present invention relates to an operating machine such as a hydraulic shovel or a crane.

2. Background Art

Most operating machines are configured such that a machine body for performing working operations is mounted on a crawler-type or wheel-type lower propelling body. For example, as for a hydraulic shovel, an upper frame is slewably mounted on a lower propelling body, and various components, such as an equipment room in which an engine and hydraulic devices are housed, a cabin designed to allow an operator to ride thereon and perform various manipulations, a working implement comprising a boom, an arm and a bucket each adapted to be moved according to a manipulation by the operator, and a counterweight for keeping front-rear balance with respect to the working implement, are installed on the upper frame.

As above, such heavy devices are installed on the upper frame, and a load change caused by traveling of the operating machine and movements of the working implement during operating of the operating machine is applied to the upper frame. Thus, the upper frame requires strength and rigidity enough to withstand the loads. Therefore, generally, a longitudinal plate and a transverse plate are assembled to the upper frame to facilitate structural reinforcement.

A plurality of devices are installed on the upper frame in a dense state, and a large number of hydraulic pressure hoses, electric cables, pipes and other elongate members (these will hereinafter be referred to collectively as "line member") are arranged to thread their way through the devices so as to mutually connect the devices.

In arrangement of a line member, for example, there is a situation where the transverse plate is provided to cross a direction along which the line member extends. In this situation, if the line member is routed to largely avoid the transverse plate, or arranged to stride over the transverse plate, layout of the line member becomes disorderly, which gives rise to a need to take time and effort for installation or removal of the line member, and is more likely to lead to a trouble such as wrong interconnection.

Therefore, in order to prevent such problems, it is implemented, for example, to make a hole in the transverse plate in accordance with arrangement of the line member and set the line member to pass through the hole. For example, refer to JP 2001-115487A and JP 2005-256569A.

However, when a hole is made in the transverse plate, a transverse cross-sectional area of the transverse plate is reduced by an opening area of the hole, and stress is likely to concentrate on a region around the hole, causing deterioration in strength of the transverse plate. Consequently, balance in strength is disrupted, which is likely to lead to deterioration in strength and rigidity of an upper frame.

Moreover, during installation or removal of the line member, it is necessary to lead or pull an elongate line member into/out from the hole all the time, so that there is a disadvantage that operation (installation/removal) efficiency becomes worse.

SUMMARY OF THE INVENTION

It is an object of the present invention to provide an operating machine capable of attaining excellent efficiency in installation or removal of a line member, while ensuring strength and rigidity of an upper frame.

According to one aspect of the present invention, there is provided an operating machine which comprises: a lower propelling body; and a machine body mounted on the lower propelling body. The machine body comprises an upper frame supported by the lower propelling body, and at least one line member for mutually connecting a plurality of devices installed to the upper frame. The upper frame has: a bottom plate; a pair of longitudinal plates each provided to stand on the bottom plate and extend in a front-rear direction, while being disposed in spaced-apart relation to each other in a right-left direction; and a transverse plate provided to stand on the bottom plate and extend in the right-left direction, while being joined to each of the longitudinal plates. A specific plate consisting of at least one of the pair of longitudinal plates and the transverse plate has an upper edge on which a pair of protrusions are provided in opposed relation to each other, and the line member is set to pass through between the pair of protrusions.

DETAILED DESCRIPTION OF THE EMBODIMENTS OF THE INVENTION

With reference to the drawings, the present invention will now be described in detail based on an embodiment thereof. The following description is essentially by way of illustration only, and thus does not limit a type of operating machine implementing the present invention and applications of the present invention.

Figure 1:
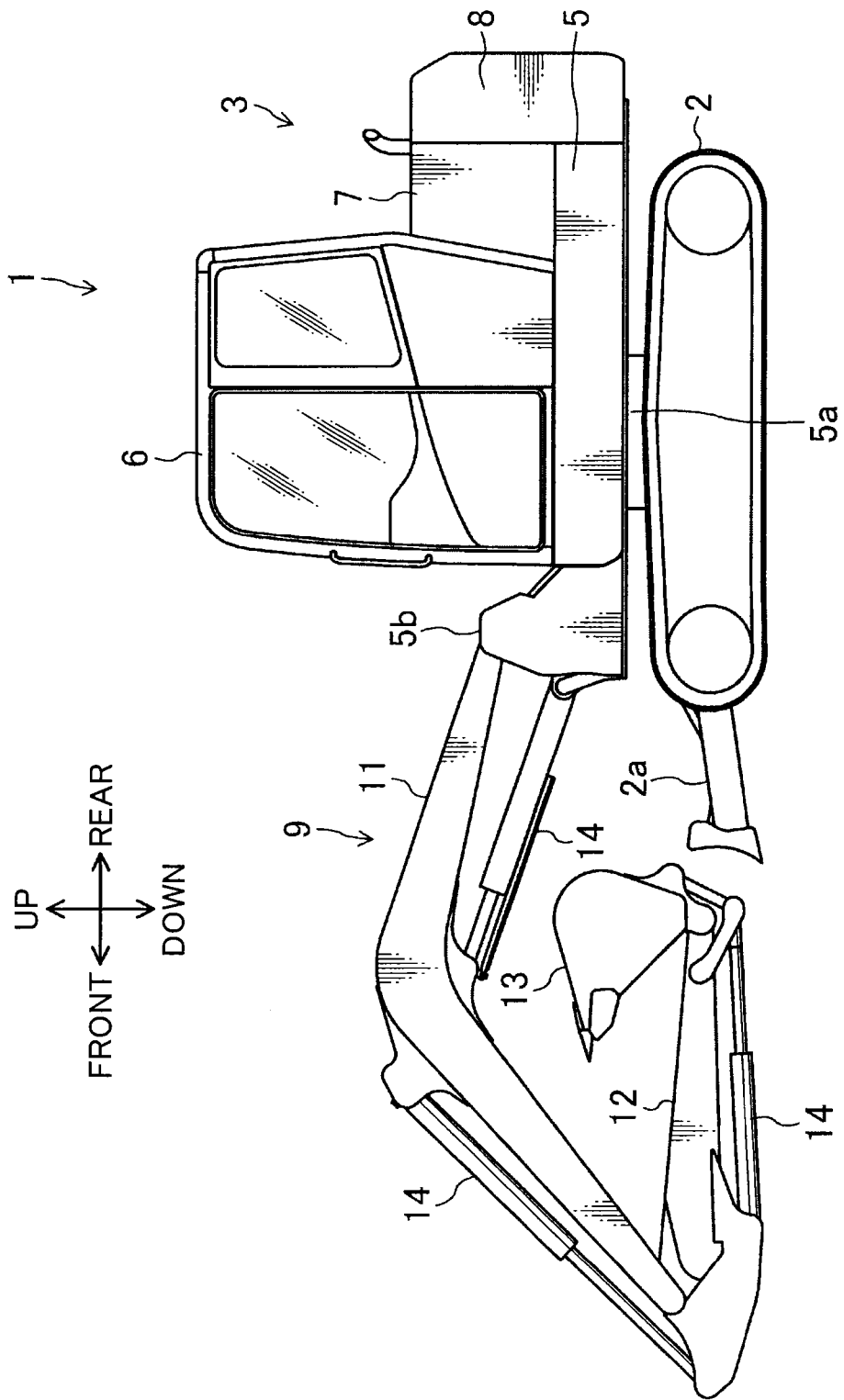
FIG. 1 is a side view of a hydraulic shovel according to one embodiment of the present invention.
Figure 2:
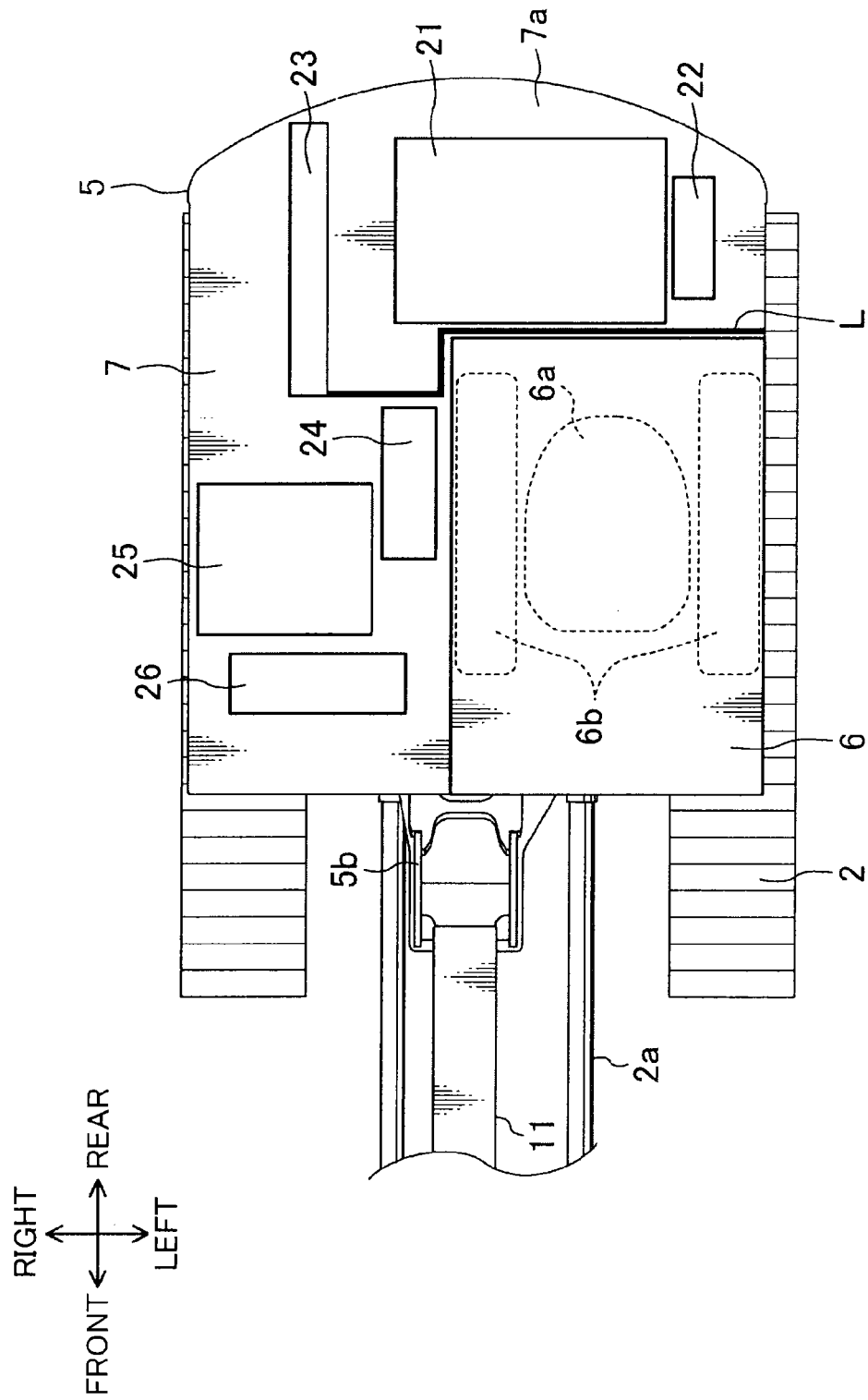
FIG. 2 is a schematic top plan view illustrating an arrangement of primary devices on an upper frame.

FIGS. 1 and 2 illustrate a hydraulic shovel 1 which is an operating machine according to one embodiment of the present invention. This hydraulic shovel 1 comprises a crawler-type lower propelling body 2, and a machine body 3 provided on the lower propelling body 2. This specific type of hydraulic shovel 1 illustrated in FIGS. 1 and 2 comprises, as standard equipment, a dozer 2*a* provided to a front end of the lower propelling body 2 so as to perform a work to push out soil or the like.

FIG. 1 indicates arrows which represent a front-rear direction and an up-down direction, and FIG. 2 indicates arrows which represent the front-rear direction and a right-left direction. Front-rear, up-down and right-left directions used in the following description are based on the directions indicated in these figures.

The machine body 3 comprises an upper frame 5, and a cabin 6, an equipment room 7, a counterweight 8 and a working implement 9 each provided on the upper frame 5.

The upper frame 5 is a rigid body having an exterior appearance which extends in an approximately horizontal direction and has a generally rectangular shape in top plan view. The upper frame 5 is structurally reinforced in strength and rigidity by combining a bottom plate 51, a pair of longitudinal plates 52, a plurality of transverse plates 54 and so on, as described later. An annular-shaped slewable support portion 5a is located on a lower side of a frontward region of a widthwise (right-left directional or transverse) intermediate portion of the upper frame 5. The upper frame 5 is supported by the lower propelling body 2 through the slewable support portion 5a. The upper frame 5 is adapted to be slewable about a central axis of the slewable support portion 5a.

The working implement 9 is disposed in front of the upper frame 5 and at a widthwise intermediate position of the machine body 3. The working implement 9 comprises a boom 11, an arm 12, a bucket 13, a plurality of hydraulic cylinders 14 and so on. Each of the hydraulic cylinders 14 is adapted to be extended and retracted under hydraulic control. Each of the boom 11, the arm 12 and the bucket 13 is adapted to be displaced in interlocking relation to extending and retracting movements of a corresponding one of the hydraulic cylinders 14.

A conventional type of hydraulic shovel is typically configured such that a support site 5b of the upper frame 5 for supporting the working implement 9 is disposed at a radially inward position of the slewable support portion 5a, i.e., at a position rearward of the support site 5b in this embodiment illustrated in FIGS. 1 and 2. However, in the specific type of hydraulic shovel 1 according to this embodiment, the support site 5b for supporting the working implement 9 is disposed to protrude frontwardly. Thus, the boom 11 is pivotally supported at a position away from the slewable support portion 5a in a radially outward direction thereof. Consequently, in the specific type according to this embodiment, a load change to be applied to the upper frame 5 due to displacement of the boom 11, the arm 12, etc., becomes larger than that in the conventional type. For this reason, this embodiment is designed to further reinforce strength and rigidity of the upper frame 5.

The counterweight 8 is installed to a rear end of the upper frame 5 to keep front-rear weight balance with respect to the working implement 9. In the specific type according to this embodiment, the counterweight 8 additionally serves as a rear cover for the equipment room 7.

The cabin 6 is disposed on a left front portion of the upper frame 5. The cabin 6 comprises a rectangular box-shaped cover covering around a operating room, the operating room designed to allow an operator to ride therein. A seat 6a to be occupied by an operator is installed in a central region of the operating room inside the cabin 6. Further, various driving/manipulation-related electric devices 6b, such as a manipulation device and a display device, are installed around the seat 6a in the operating room.

The equipment room 7 is provided over a region ranging from a right front section to a rear section of the machine body 3. An engine 21, a hydraulic pump 22, a cooling device 23, a hydraulic oil tank 24, a fuel tank 25, a control valve 26 and other devices are closely installed inside the equipment room 7. Further, a large number of electric cables, hydraulic pressure hoses, pipes and other elongate members are arranged to thread their way through the devices so as to mutually connect the devices. The large number of electric cables, hydraulic pressure hoses, pipes and other elongate members will hereinafter be also referred to collectively as "line member 28".

As illustrated in FIG. 2, the engine 21 is installed in a predetermined region in the rear section of the machine body 3, the predetermined region ranging from an approximately central position in the widthwise direction (right-left direction) to a left side in the rear section of the machine body 3, and the engine 21 is disposed in a posture where a drive shaft of the engine 21 extends in the widthwise direction (right-left direction). The hydraulic pump 22 is disposed on a left side of the engine 21 in side-by-side relation. The hydraulic oil tank 24, the fuel tank 25 and the control valve 26 are installed in a region ranging from the right front section of the machine body 3 to a position slightly rearward of the right front section, and at positions away from the engine 21.

Although not illustrated, the equipment room 7 is internally divided into a plurality of spaces. Among the plurality of spaces, particularly in a space in which the engine 21 is installed (hereinafter also referred to as "engine room 7a"), heat and noise are generated during operation of the engine 21. Thus, in order to prevent such heat and noise from leaking from the equipment room 7, measures to enhance thermal insulation and noise insulation performances are implemented.

For example, in the hydraulic shovel 1, a boundary zone between the engine room 7a and the cabin 6 installed in front of and in adjacent relation to the engine room 7a, i.e., a zone indicated by the heavy line L in FIG. 2, is air-tightly closed up.

Figure 3:
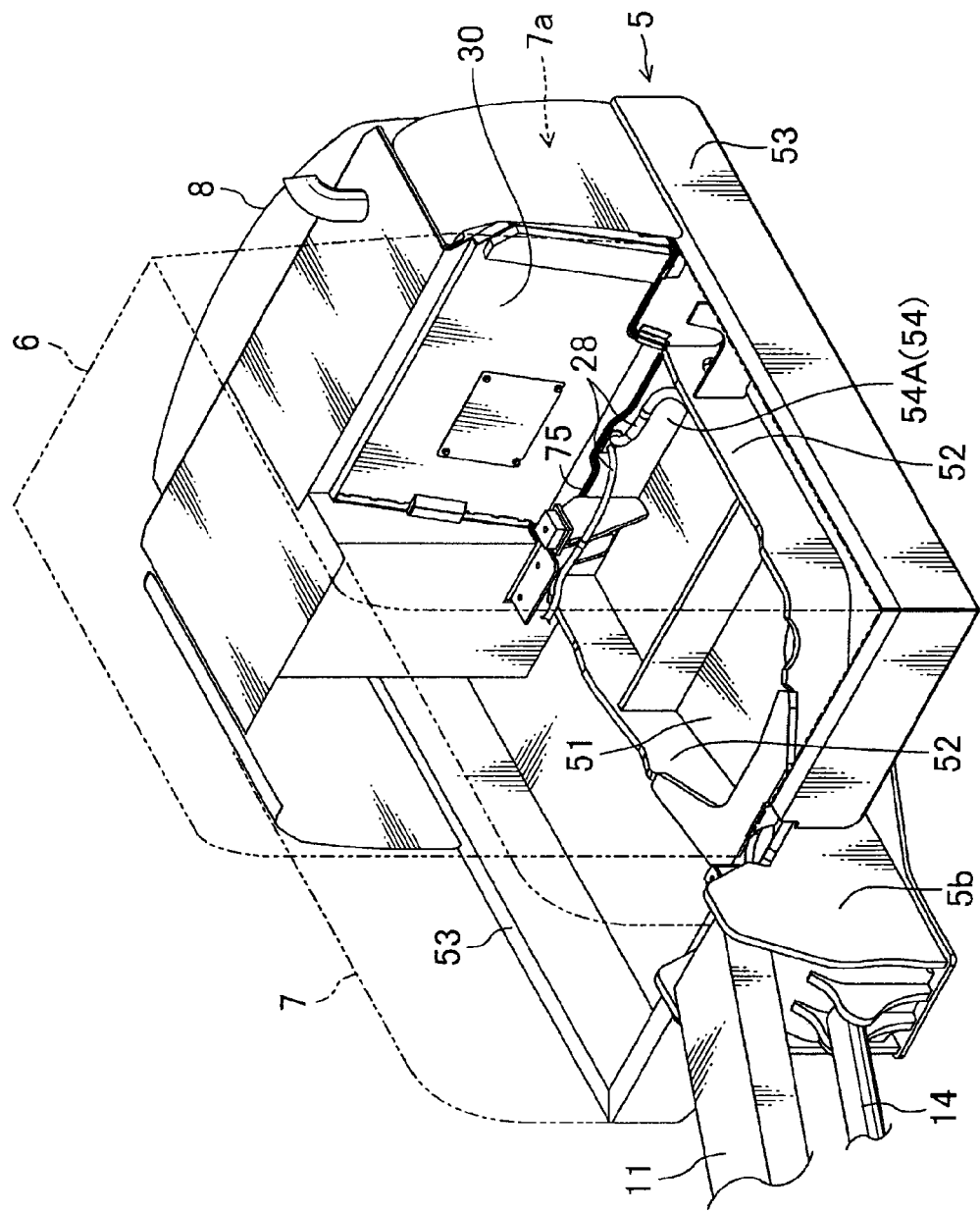
FIG. 3 is a schematic perspective view illustrating a structure of a substantial part of a machine body.

FIG. 3 illustrates details of the boundary zone. As illustrated in FIG. 3, a rectangular-shaped partition plate 30 is installed in front of the engine room 7a. The partition plate 30 air-tightly closes up a front side of the engine room 7a, in cooperation with a transverse plate 54 provided on the upper frame 5, specifically, an aftermentioned partitioning transverse plate 54A.

Figure 4:
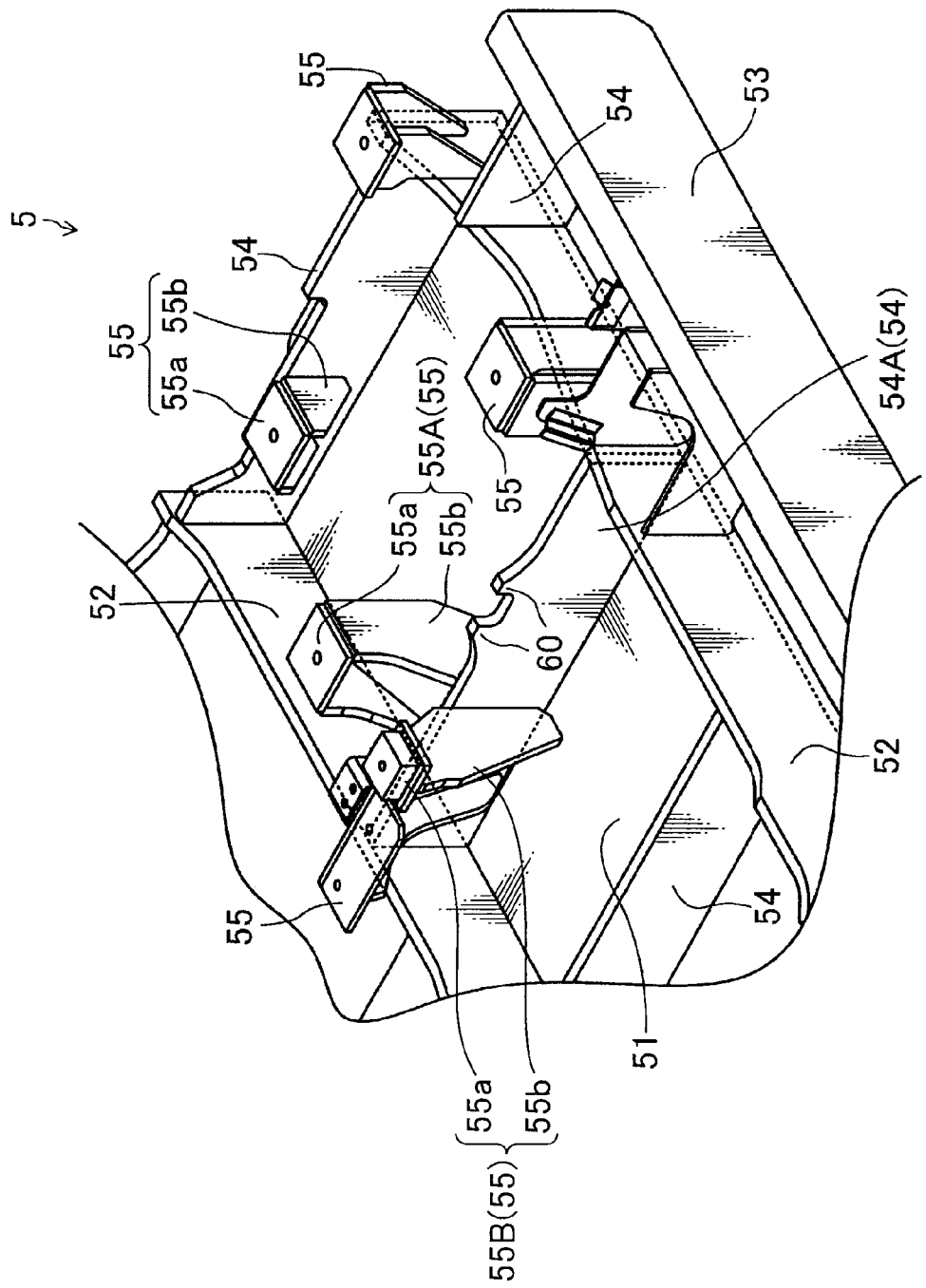
FIG. 4 is a schematic perspective view illustrating a structure of a substantial part of the upper frame.

As illustrated in detail in FIG. 4, the upper frame 5 comprises a bottom plate 51, a pair of right and left longitudinal plates 52, a pair of right and left side frames 53, a plurality of transverse plates 54, and a plurality of brackets 55.

More specifically, the bottom plate 51 is a thick metal plate installed such that a plate surface thereof extends in an approximately horizontal direction. Each of the longitudinal plates 52 is composed of a strip-shaped thick metal plate. The pair of longitudinal plates 52 are installed in spaced-apart relation to each other in a right-left direction, and each of them is installed to extend in a front-rear direction. Each of the longitudinal plates 52 is disposed in a posture where a left side surface thereof and a right side surface thereof extend in a direction approximately perpendicular to the bottom plate 51. Each of the longitudinal plates 52 has a lower edge welded to an upper surface of the bottom plate 51. Each of the longitudinal plates 52 has a front end which protrudes frontwardly from the side frames 53 to form the aforementioned support site 5b. Each of the side frames 53 are disposed along a respective one of right and left edges of the upper frame 5.

Each of the transverse plates 54 is composed of a strip-shaped metal plate. Each of the transverse plates 54 is installed at a predetermined position between the right and left longitudinal plates 52, and a predetermined position between each of the side frames 53 and a corresponding one of the longitudinal plates 52. Each of the transverse plates 54 is installed in a posture where a front side surface thereof and a rear side surface thereof extend in a direction approximately perpendicular to the bottom plate 51. Each of the transverse plates 54 has right and left edges weldingly joined, respectively, to opposed side surfaces of the longitudinal plates 52 or opposed side surfaces of the side frames 53, and a lower edge weldingly joined to the upper surface of the bottom plate 51.

Each of the brackets 55 has a seat portion 55a having an exposed upper surface, and a support portion 55b supporting the seat portion 55a. Each of the brackets 55 is disposed at a respective one of a plurality of predetermined positions, and each of the support portions 55b of the brackets 55 is welded to one of the longitudinal plates 52, the side frames 53 or the bottom plate 51. The seat portion 55a is adapted to mount thereon the cabin 6 or the engine 21.

(Partitioning Transverse Plate)

In this hydraulic shovel 1, measures to facilitate installation or removal of a line member 28 while ensuring strength and rigidity of an upper frame 5 are implemented, particularly, in one of the transverse plates 54 which is located on a lower side of the partition plate 30. The transverse plate 54 located on the lower side of the partition plate 30 will hereinafter be referred to as "partitioning transverse plate 54A".

The partitioning transverse plate 54A is installed between the right and left longitudinal plates 52 in approximately orthogonal relation with the longitudinal plates 52. The partitioning transverse plate 54A has right and left edges welded to respective one of the opposed side surfaces of the longitudinal plates 52. The partitioning transverse plate 54A has a lower edge welded to the upper surface of the bottom plate 51. In other words, the partitioning transverse plate 54A is fixed to the longitudinal plates 52 and the bottom plate 51 in approximately orthogonal relation with each of the longitudinal plates 52 and the bottom plate 51. In this way, the partitioning transverse plate 54A structurally reinforces the upper frame 5.

The partitioning transverse plate 54A is additionally used as a support member for a part of the brackets 55. Specifically, as shown in FIG. 4, the plurality of brackets 55 include an engine bracket 55A disposed on a rear side of the partitioning transverse plate 54A, and a cabin bracket 55B disposed on a front side of the partitioning transverse plate 54A. The support portion 55b of the engine bracket 55A is welded to a rear side surface of the partitioning transverse plate 54A, and the bottom plate 51. The support portion 55b of the cabin bracket 55B is welded to a front side surface of the partitioning transverse plate 54A, and the bottom plate 51. Thus, a load of the cabin 6 and a load of the engine 21 are directly applied to the partitioning transverse plate 54A from respective front and rear sides thereof. Therefore, the partitioning transverse plate 54A is susceptible to deformation such as bending deformation or torsional deformation. For this reason, the partitioning transverse plate 54A requires high strength and rigidity.

Meanwhile, it is necessary to connect the engine 21 to the electric devices 6b in the cabin 6 and the fuel tank 25 through an electric wire, a pipe and others. It is also necessary to connect the hydraulic pump 22 to the hydraulic oil tank 24 and the control valve 26 through a hydraulic pressure hose. In connection with layout, some of the line members 28 have to be arranged to pass through a front side of the engine room 7a. If a hole is made in the partitioning transverse plate 54A, and such a line member 28 is installed to pass through the hole, a transverse cross-sectional area of the partitioning transverse plate 54A is reduced by an opening area of the hole, so that strength and rigidity of the partitioning transverse plate 54A are deteriorated. In this case, during installation or removal of a line member 28, a complicated operation of inserting or pulling the line member 28 into/out from the hole of the partitioning transverse plate 54A inevitably occurs.

Therefore, in the hydraulic shovel 1 according to this embodiment, a pair of protrusions 60 are provided on an upper edge of the partitioning transverse plate 54A, and a line member 28 is set to pass through between the pair of protrusions 60.

Figure 5:
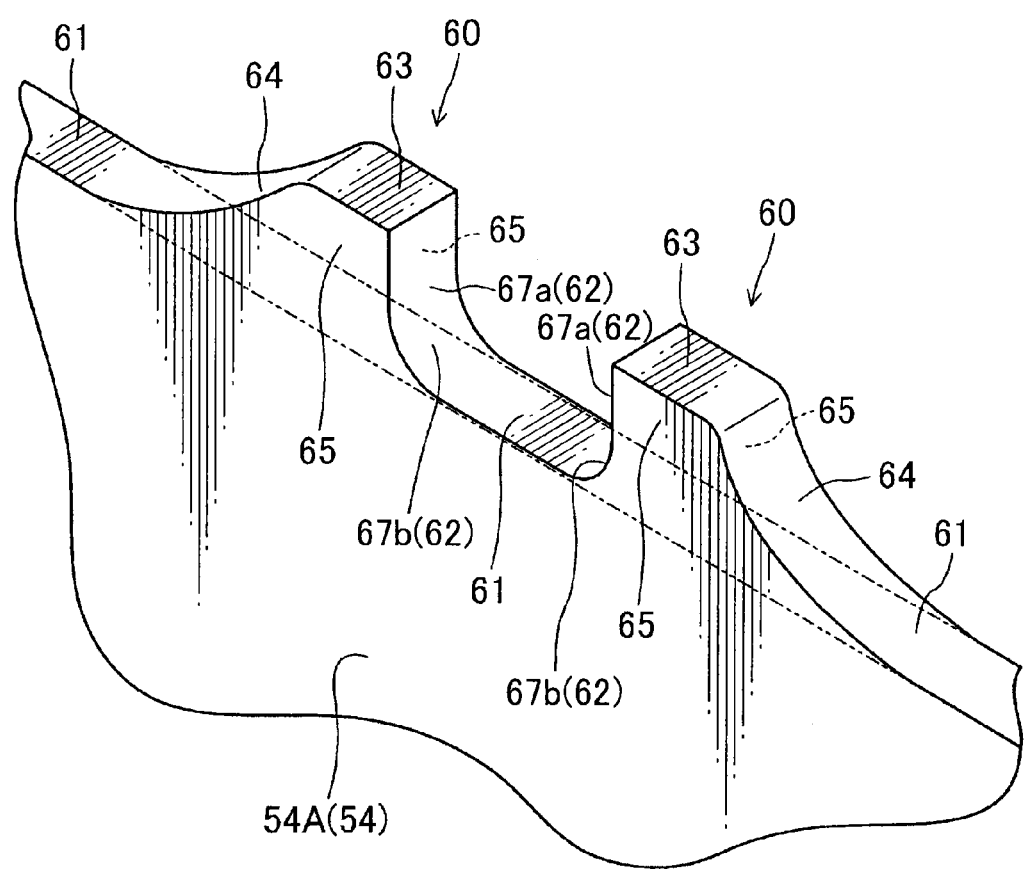
FIG. 5 is a schematic perspective view illustrating a structure of a substantial part of a partitioning transverse plate.

As illustrated in detail in FIG. 5, the pair of protrusions 60 in this embodiment are integrally formed with the partitioning transverse plate 54A. In other words, the pair of protrusions 60 are provided to continuously connect to the partitioning transverse plate 54A.

The pair of protrusions 60 are disposed to protrude upwardly from the upper edge of the partitioning transverse plate 54A, in a posture where they are opposed to each other. The two-dot chain line in FIG. 5 denotes an extension line of the upper edge of the partitioning transverse plate 54A. As above, in this embodiment, a line member 28 is arranged to stride over the partitioning transverse plate 54A, and positioned by the pair of protrusions 60, so that there is no need to make, in the partitioning transverse plate 54A, a hole for allowing the line member 28 to pass therethrough. Thus, a required cross-sectional area of the partitioning transverse plate 54A is ensured over the entire partitioning transverse plate 54A. As a result, the strength and rigidity of the partitioning transverse plate 54A are never impaired.

When viewed in the front-rear direction, each of the protrusions 60 has a trapezoid-like contour whose upper base is offset toward an interspace between the protrusions 60. The pair of protrusions 60 are disposed on the upper edge of the partitioning transverse plate 54A in right-left symmetric relation. More specifically, each of the protrusions 60 has: a facing surface 62 and an outer skirt surface 64 each continuously connecting to an upper edge surface 61 of the partitioning transverse plate 54A; a top surface 63 connecting respective upper edges of the facing surface 62 and the outer skirt surface 64; and a pair of side surfaces 65.

One of the pair of side surfaces 65 continuously connects to respective front edges of the surfaces 62, 63, 64, and a front side surface of the partitioning transverse plate 54A, and the other side surface 65 continuously connects to respective rear edges of the surfaces 62, 63, 64, and a rear side surface of the partitioning transverse plate 54A. The facing surface 62 of the right protrusion 60 faces leftwardly, and the facing surface 62 of the left protrusion 60 faces rightwardly. The facing surfaces 62 of the two protrusions 60 are opposed to each other. The facing surface 62 of each of the protrusions 60 has a perpendicular surface region 67a and a curved surface region 67b. The perpendicular surface region 67a is located above the upper edge of the partitioning transverse plate 54A to extend perpendicularly with respect to the upper edge (upper edge surface 61). The curved surface region 67b has a curve shape curved from a lower end of the perpendicular surface region 67a in a direction causing a distance from the outer skirt surface 64 of the protrusion 60 with this curved surface region 67b to gradually increase toward a downward direction, and continuously connects to the upper edge surface 61 of the partitioning transverse plate 54A. In other words, in each of the protrusions 60, a region of the facing surface 62 continuously connecting to the upper edge surface 61 of the partitioning transverse plate 54A, i.e., the curved surface region 67a, is formed as a curved surface-like internal corner through a curved surface forming process. The top surface 63 continuously connects to the upper edge of the facing surface 62, and faces upwardly. The outer skirt surface 64 continuously connects to the top surface 63, while being located on a side opposite to the facing surface 62. The outer skirt surface 64 inclines obliquely downwardly in a direction causing a distance from the facing surface 62 to gradually increase toward the partitioning transverse plate 54A (downward direction), and continuously connects to the upper edge surface 61 of the partitioning transverse plate 54A.

In each of the protrusions 60, a region of the facing surface 62, which is continuously connected to the upper edge surface 61 of the partitioning transverse plate 54A, is formed as the curved surface region 67a, as mentioned above. Thus, even if the protrusion 60 is formed on a part of the upper edge of the partitioning transverse plate 54A, it becomes possible to ease a phenomenon that a stress concentrates on the region of the facing surface 62 of the protrusion 60 which is continuously connected to the upper edge surface 61 of the partitioning transverse plate 54A.

Further, in each of the protrusions 60, the outer skirt surface 64 is formed as an inclined surface. Thus, as with the curved surface region 67a, it becomes possible to ease stress concentration in a connection region between the outer skirt surface 64 and the upper edge surface 61 of the partitioning transverse plate 54A.

Figure 6:
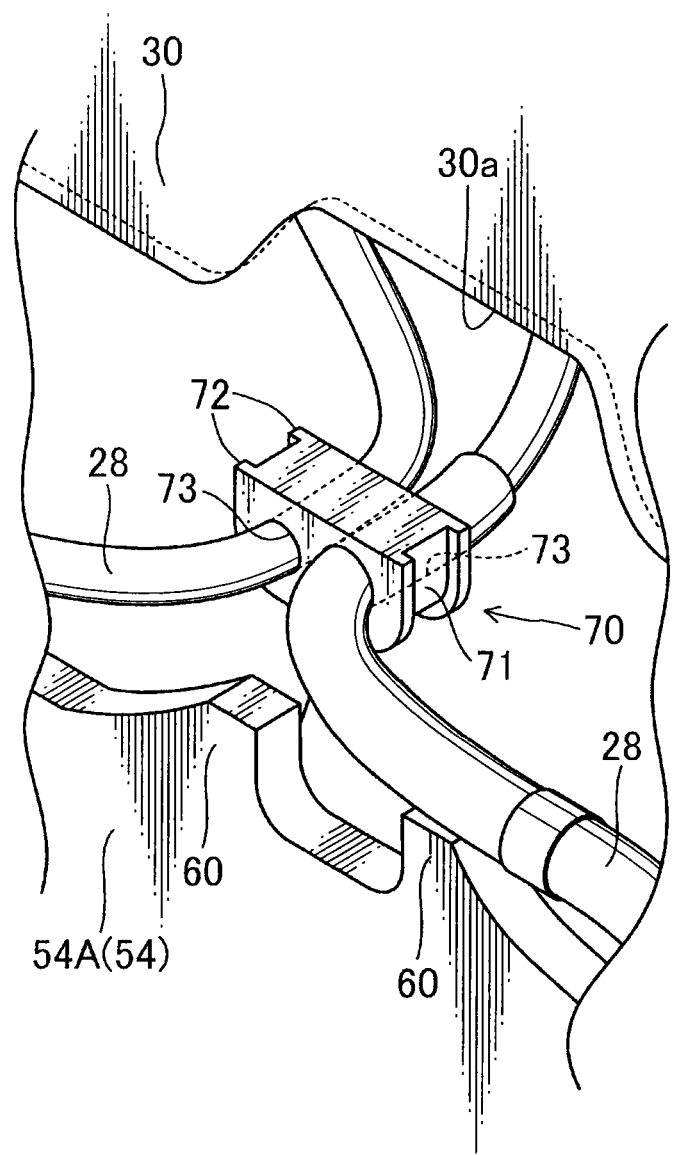
FIG. 6 is a diagram for explaining installation of a grommet or the like between a pair of protrusions.

With reference to FIG. 6, a grommet 70 made of an elastic resin material is detachably fitted between the pair of protrusions 60. The grommet 70 is one example of a "holding member" set forth in the appended claims. The grommet 70 has a fitting portion 71 with an outer size equal to or slightly greater than an inner size between the protrusions 60, and a pair of flanges 72 each disposed, respectively, on front and rear sides of the fitting portion 71 to protrude from right, left and lower edges of the fitting portion 71. The pair of flanges 72 are arranged in opposed relation to each other in the front-rear direction.

The fitting portion 71 has at least one through-hole 73. In this embodiment, the fitting portion 71 has two through-holes 73. Each of the through-holes 73 is formed to penetrate through the fitting portion 71 in the front-rear direction. The grommet 70 is adapted to hold two line members 28 in a state in which the line members 28 are penetratingly inserted in respective ones of the through-holes 73. In other words, the grommet 70 is adapted to hold the two line members 28 in a lump, while being fitted between the pair of protrusions 60. A hole diameter of the through-hole 73 is set in accordance with a line member 28 to be inserted thereinto, i.e., designed to prevent formation of a gap between an outer surface of the line member 28 and an inner surface of the through-hole 73.

During installation of two line members 28, the line members 28 are penetratingly inserted into corresponding ones of the through-holes 73 of the grommet 70, and then the grommet 70 is press-fitted between the protrusions 60. Thus, a movement of the grommet 70 in the right-left direction is restricted by the pair of protrusions 60. Further, the pair of flanges 72 are brought into contact, respectively, with front and rear surfaces of an upper end of the partitioning transverse plate 54A, so that a movement of the grommet 70 in the front-rear direction is restricted. Consequently, it becomes possible to hold the line members 28 while allowing them to be located at a predetermined position. In this way, the line members 28 can be hold at a predetermined position only by fitting the grommet 70 between the protrusions 60 from thereabove, so that it becomes possible to easily perform installation or removal of the line members 28.

After the grommet 70 is fitted between the protrusions 60 in the above manner, the partition plate 30 is installed above and in adjacent relation to the upper edge of the partitioning transverse plate 54A. The partition plate 30 is disposed above the pair of protrusions 60 in such a manner as to prevent disengagement (pull-out) of the grommet 70 fitted between the pair of protrusions 60.

Figure 7:
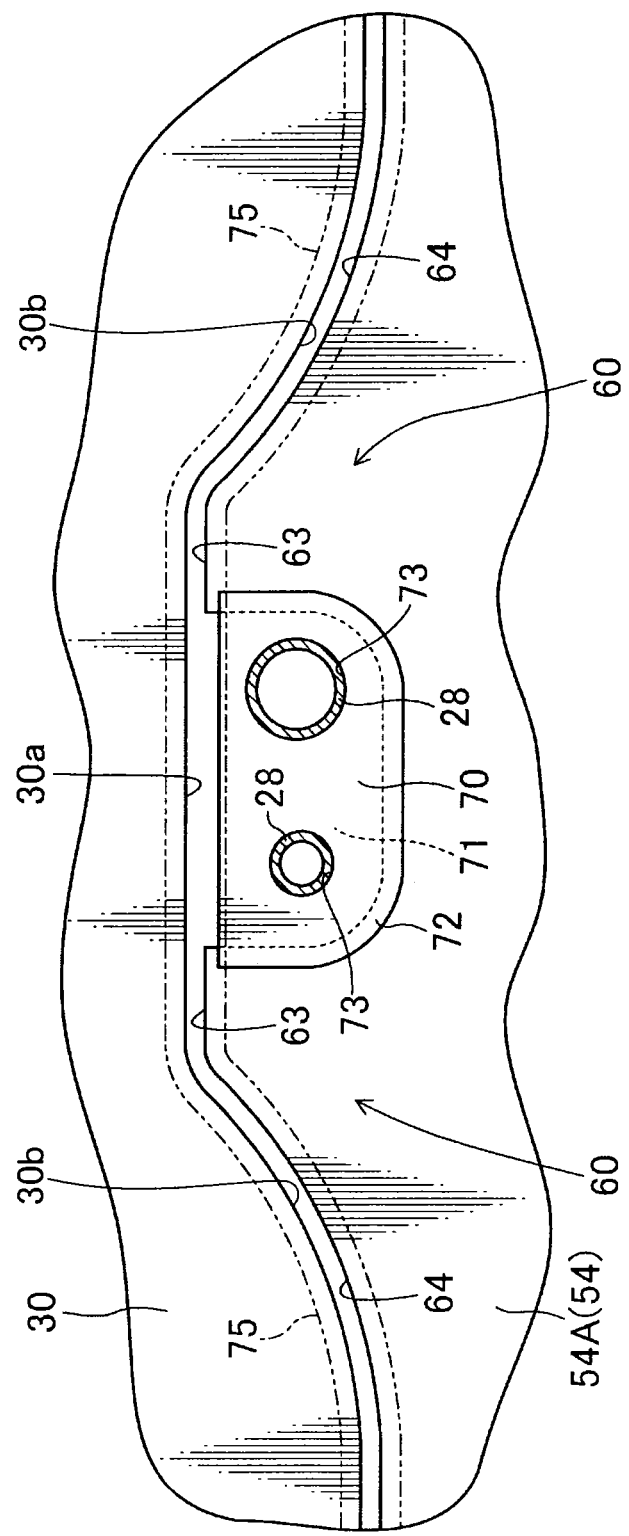
FIG. 7 is a schematic illustrating a state after completion of installation of the grommet or the like between the pair of protrusions.

The partition plate 30 has a lower edge located in opposed relation to the upper edge of the partitioning transverse plate 54A. Further, the lower edge of the partition plate 30 has a cutout 30a formed in a region opposed to the protrusions 60. The cutout 30a is formed in a generally trapezoidal shape conforming to a line defined by an outer line of the protrusions 60, i.e., the outer skirt surfaces 64 and the top surfaces 63 of the protrusions 60, when viewed in the front-rear direction. As illustrated in FIG. 7, the protrusions 60 are received in the cutout 30a. In other words, the cutout 30a is located in opposed relation to the outer skirt surfaces 64 of the pair of protrusions 60, and formed to have an inner surface 30b extending along the outer skirt surfaces 64 of the protrusions 60. The lower edge of the partition plate 30 has a specific part other than the cutout 30a, the specific part linearly extending in the right-left direction and extending along the upper edge of the partitioning transverse plate 54A. Based on the above configuration, the partition plate 30 is installed just above the partitioning transverse plate 54A while leaving only a slight gap between the upper edge of the partitioning transverse plate 54A and the lower edge of the partition plate 30.

The installation of the partition plate 30 makes it possible to restrict an upward movement of the grommet 70, thereby preventing the grommet 70 from being pulled out from between the protrusions 60.

In addition, when the partition plate 30 is installed above the partitioning transverse plate 54A, the partition plate 30 can be easily positioned with respect to the partitioning transverse plate 54A. Specifically, the cutout 30a is formed such that a right-left directional width thereof gradually increases toward the downward direction, whereas the outer line of the protrusions 60 has a downwardly widened shape with a narrowed upper end according to the right and left outer skirt surfaces 64. Thus, based on fitting between the cutout 30a and the pair of protrusions 60, the partition plate 30 can be easily guided to a predetermined position in the right-left direction.

After the partition plate 30 is installed above the partitioning transverse plate 54A, a gasket 75 is attached between the lower edge of the partition plate 30 and the upper edge of the partitioning transverse plate 54A to close the slight gap between the lower edge of the partition plate 30 and the upper edge of the partitioning transverse plate 54A. The gasket 75 is one example of a sealing member. The gasket 75 is indicated by the solid line in FIG. 3, and indicated by the two-dot chain line in FIG. 7. Based on the above configuration, the front of the engine room 7a can be substantially fully sealed while permitting a line member 28 to cut across the partitioning transverse plate 54A, so that it becomes possible to effectively suppress frontward leakage of heat and noise generated in the engine room 7a.

(First Modification)

Figure 8:
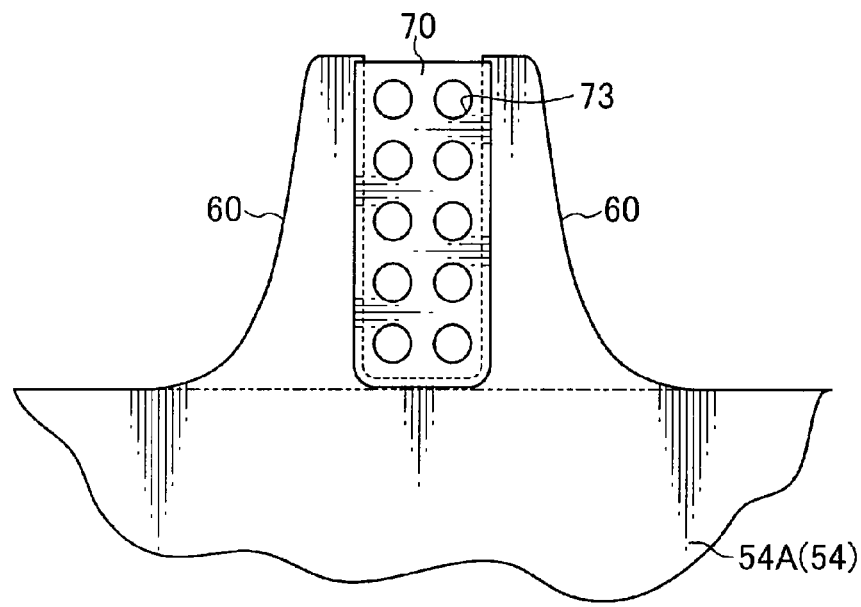
FIGS. 8 and 9 are schematic diagrams illustrating two examples of a first modification of the above embodiment.
Figure 9:
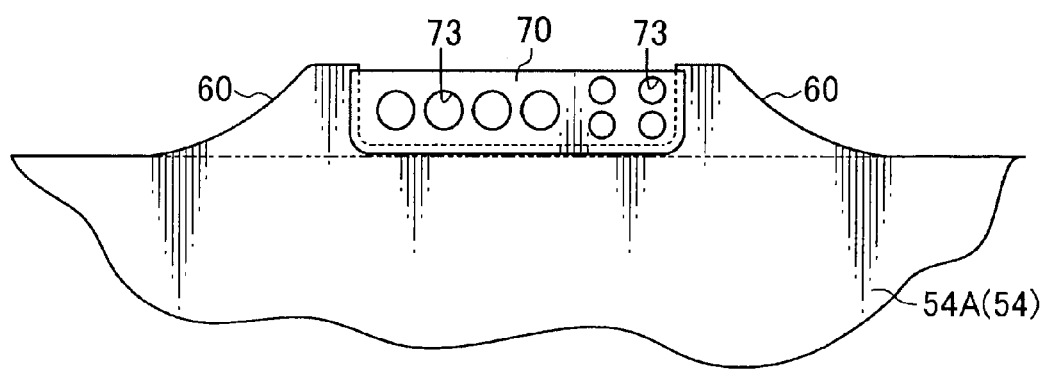

FIGS. 8 and 9 illustrate examples of a first modification of the above embodiment. The above embodiment has been described based on an example in which two line members 28 are set to pass through between the pair of protrusions 60. However, the number, arrangement and each shape (size) of line members 28 to be set to pass through between the protrusions 60 may be appropriately changed according to specifications. Further, in conformity to the number, arrangement and each shape (size) of line members 28 to be set to pass through between the protrusions 60, the arrangement and each shape of the protrusions 60 and the shape of the grommet 70 may be appropriately changed.

For example, as illustrated in FIG. 8, each of the protrusions 60 may be formed in a vertically long shape, and a vertically-long grommet 70 formed with a plurality of through-holes 73 arranged side-by-side in a vertical multi-stage manner may be attached between the protrusions 60. Alternatively, as illustrated in FIG. 9, the protrusions 60 may be arranged in largely spaced-apart relation to each other in the right-left direction, and a horizontally-long grommet 70 formed with a plurality of through-holes 73 arranged side-by-side in the transverse direction may be attached between the protrusions 60.

(Second Modification)

Figure 10:
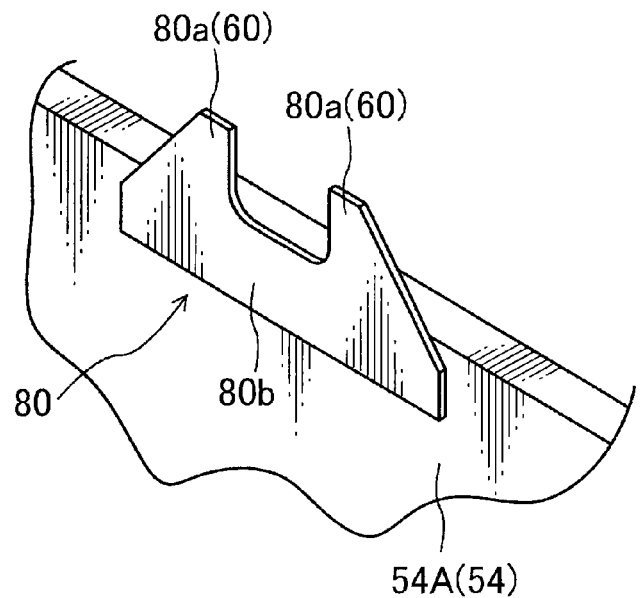
FIGS. 10 and 11 are schematic perspective views illustrating two examples of a second modification of the above embodiment.
Figure 11:
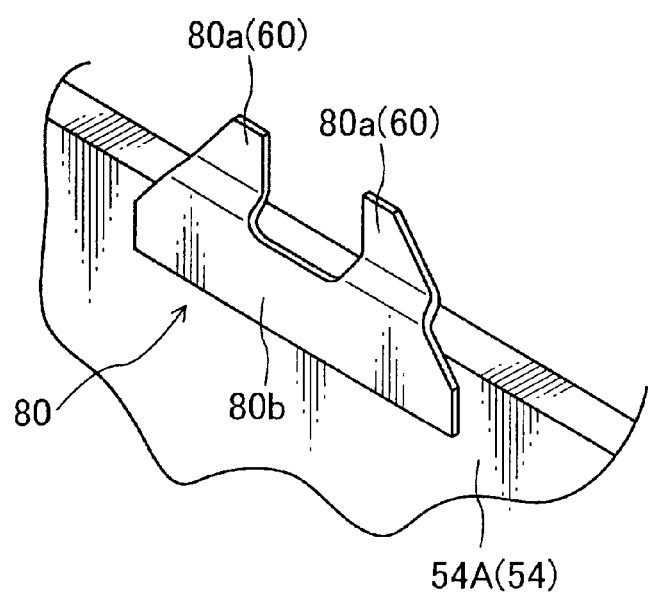

FIGS. 10 and 11 illustrate examples of a second modification of the above embodiment. The above embodiment has been described based on an example in which the protrusions 60 are integrally formed with the partitioning transverse plate 54A. However, the protrusions 60 may be composed of a member separate from the partitioning transverse plate 54A, and attached to the partitioning transverse plate 54A. In this case, it becomes possible to easily change a shape, etc., of the protrusions 60 to provide enhanced versatility, and eliminate the risk of impairing original strength and rigidity of the partitioning transverse plate 54A.

For example, as illustrated in FIGS. 10 and 11, a joinable piece 80 may be formed using a metal plate, in such a manner that the joinable piece 80 has a pair of protruding portions 80a corresponding to the pair of protrusions 60 in the above embodiment, and a base portion 80b provided integrally with the protruding portions 80a to support the protruding portions 80a. In this case, the joinable piece 80 may be weldingly fixed to a predetermined region of a front or rear side surface of the partitioning transverse plate 54A.

Figure 12:
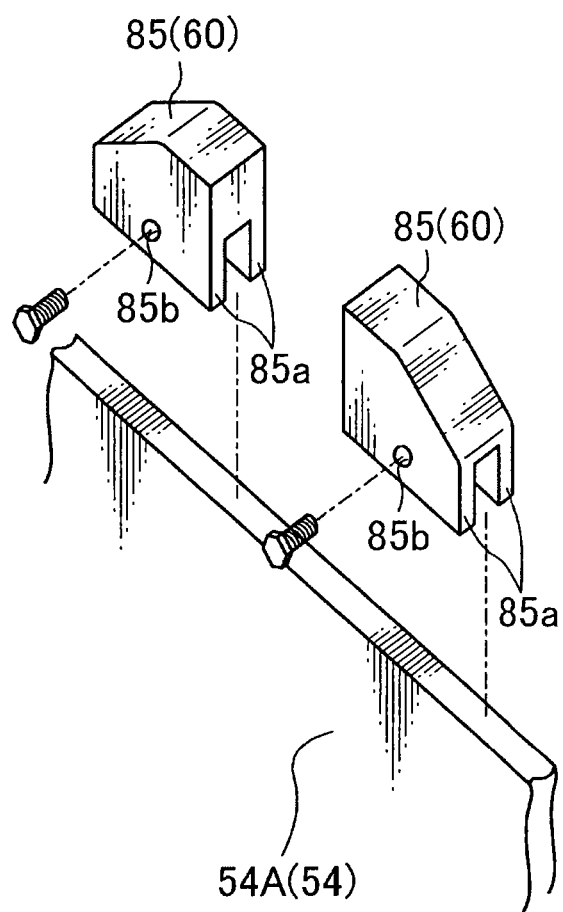
FIG. 12 is a schematic perspective view illustrating another example of the second modification of the above embodiment.

Alternatively, the pair of protrusions 60 may be separately formed, and the separate protrusions 60 may be fixed to respective arbitrary positions of the upper edge of the partitioning transverse plate 54A, individually. For example, as illustrated in FIG. 12, a protrusion member 85 corresponding to each of the individual protrusions 60 is configured such that a lower portion thereof is provided with a pair of legs 85a disposed in opposed and spaced-apart relation to each other in the front-rear direction, and arranged to receive the upper edge of the partitioning transverse plate 54A (the transverse plate 54) between the pair of legs 85a in such a manner as to allow the legs 85a and the partitioning transverse plate 54A (the transverse plate 54) to be slidably moved relative to each other. At least one of the legs 85a has an internally threaded screw hole 85b formed to penetrate therethrough in the front and rear direction. Then, each of the protrusion members 85 is fixed to an arbitrary position of the partitioning transverse plate 54A by screwing a fastening member such as a bolt into the screw hole 85b.

It is to be understood that the operating machine of the present invention is not limited to the above embodiment, etc, but may include various other configurations.

For example, a specific plate having the protrusions is not limited to the partitioning transverse plate 54A, but may be the transverse plate 54 other than the partitioning transverse plate 54A, or the longitudinal plate 52.

Further, the gap between the pair of protrusions 60 and a line member 28 may be sealed directly by the gasket 75 or the like, without using the grommet 70.

The grommet 70 may be composed of a plurality of grommet segments each prepared for a respective one of a plurality of types of line members 28. In this case, the line members 28 can be installed and removed on a type-by-type basis, thereby providing excellent operation efficiency.

The operating machine may be provided with at least one line member. In this case, a grommet serving as a holding member may have at least one through-hole. For example, the operating machine may be configured such that the grommet has only one through-hole, and one line member is set to penetrate through the through-hole.

[Outline of Embodiment]

The outline of the above embodiment is as follows.

The operating machine according to the above embodiment comprises: a lower propelling body; and a machine body mounted on the lower propelling body. The machine body comprises an upper frame supported by the lower propelling body, and at least one line member for mutually connecting a plurality of devices installed to the upper frame. The upper frame has: a bottom plate; a pair of longitudinal plates each provided to stand on the bottom plate and extend in a front-rear direction, while being disposed in spaced-apart relation to each other in a right-left direction; and a transverse plate provided to stand on the bottom plate and extend in the right-left direction, while being joined to each of the longitudinal plates. A specific plate consisting of at least one of the pair of longitudinal plates and the transverse plate has an upper edge on which a pair of protrusions are provided in opposed relation to each other, and the line member is set to pass through between the pair of protrusions. As used here, the term "line member" is a collective term for electric cables, hoses, pipes and other elongate members.

In this operating machine, a pair of mutually opposed protrusions are provided to an upper edge of a specific plate consisting of at least one of the pair of longitudinal plates and the transverse plate. The protrusions are formed to protrude upwardly from the upper edge of the specific plate, so that an original cross-sectional area of the longitudinal or transverse plate is maintained. Thus, it becomes possible to prevent deterioration in strength and rigidity of the longitudinal or transverse plate, and thus prevent deterioration in strength and rigidity of the upper frame. In this operating machine, the line member is set to pass through between the pair of protrusions, so that the line member can be installed while being located at a predetermined position, only by pushing the line members into between the protrusions. Thus, it becomes possible to facilitate installation or removal of the line member, as compared to a conventional countermeasure designed to set a line member to pass through a hole, thereby enhancing operation efficiency. In addition, the line member can be held at a predetermined position, so that it becomes possible to keep layout of the line member from becoming disorderly.

Preferably, the above operating machine further comprises a holding member adapted to be detachably fitted between the pair of protrusions, wherein the holding member has at least one through-hole, and the holding member is adapted to hold the line member in a state in which the line member is penetratingly inserted into the through-hole.

According to this feature, the holding of the line member becomes more stable, and the operation efficiency is also enhanced.

In this operating machine, when the at least one line member includes a plurality of line members, it is preferable that the holding member has a plurality of through-holes as the at least one through-hole, the plurality of through-holes allowing the plurality of line members to be penetratingly inserted into respective ones thereof, and the holding member is adapted to hold the plurality of line members in a lump while being fitted between the pair of protrusions.

According to this feature, the plurality of line members can be held in a lump between the pair of protrusions, so that it becomes possible to improve neatness in layout of the line members. In addition, according to this feature, the plurality of line members can be installed or removed into/from an interspace between the pair of protrusions, only by attaching or detaching the holding member to/from the interspace between the pair of protrusions, so that it becomes possible to enhance operation efficiency of installation or removal of the plurality of line members.

Preferably, the operating machine having the holding member further comprises a partition plate for partitioning a space above the upper frame, wherein the partition plate has a portion which is disposed on an upper side of the pair of protrusions in such a manner as to prevent disengagement of the holding member fitted between the pair of protrusions.

According to this feature, disengagement of the holding member from the interspace between the pair of protrusions can be prevented by utilizing the partition plate for partitioning a space above the upper frame, so that it becomes possible to prevent the occurrence of disorder in layout of the line member due to the disengagement of the holding member, while avoiding an increase in the number of components.

More preferably, in this operating machine, the partition plate has a lower edge located in opposed relation to the upper edge of the specific plate, and the lower edge of the partition plate has a cutout formed in a specific region of the lower edge, which region is opposed to the pair of protrusions, the cutout having a shape extending along an outer line of the pair of protrusions.

According to this feature, through an operation of moving the partition plate to allow the pair of protrusions to be received in the cutout, the partition plate can be disposed in adjacent relation to the specific plate, in such a manner that the lower edge thereof comes fairly close to the upper edge of the specific plate. Thus, even if the partition plate is disposed just above the specific plate and the pair of protrusions, a gap between the lower edge of the partition plate and the upper edge of the specific plate can be reduced. Therefore, it becomes possible to easily seal a gap between the lower edge of the partition plate and the upper edge of the specific plate.

More preferably, in this operating machine, each of the pair of protrusions has a facing surface opposed to that of the counterpart, and an outer shirt surface provided on a side opposite to the facing surface, the outer shirt surface of each of the pair of protrusions inclines in a direction causing a distance from the facing surface of the protrusion to gradually increase toward a downward direction, and the cutout has an inner surface located in opposed relation to the outer skirt surfaces of the pair of protrusions, the inner surface having a shape which extends along the outer skirt surfaces of the pair of protrusions.

According to this feature, even if the outer skirt surface of one of the protrusions and the inner surface of the cutout are brought into contact with each other during the operation of installing the partition plate, the inner surface of the cutout is smoothly guided by the outer skirt surface of the protrusion in such a manner that the partition plate is positioned to allow the protrusions to fall within a normal positional range inside the cutout, so that the partition plate can be easily guided to a predetermined position with respect to the specific plate. Thus, it becomes possible to enhance operation efficiency during the installation of the partition plate.

In the operating machine according to the above embodiment, the pair of protrusions may be formed integrally with the specific plate, and the facing surface of each of the pair of protrusions may have a perpendicular surface region located above the upper edge of the specific plate to extend perpendicularly with respect to the upper edge, and a curved surface region may have a curve shape curved from a lower end of the perpendicular surface region in a direction causing a distance from the outer skirt surface of the protrusion to gradually increase toward a downward direction to be continuously connected to the upper edge of the specific plate.

According to this feature, even if the pair of protrusions are integrally formed with the specific plate, it becomes possible to ease a phenomenon that a stress concentrates on the curved surface region of the facing surface of each of the protrusions continuously connecting to the upper edge of the specific plate. Thus, it becomes possible to accurately ensure the strength and rigidity of the longitudinal or transverse plate.

In the operating machine according to the above embodiment, the pair of protrusions may be formed as a member separate from the specific plate, and attached to the specific plate.

According to this feature, it becomes possible to eliminate a need for modifying a shape of the longitudinal or transverse plate to allow the protrusions to be provided thereto, so that it becomes possible to reliably maintain original strength and rigidity of the longitudinal or transverse plate. In addition, a configuration of the protrusions can be changed according to specifications, thereby providing excellent versatility.

As described above, in the above embodiment, a line member can be adequately laid out without making a hole in the transverse or longitudinal plate, so that it becomes possible to provide an operating machine capable of attaining excellent efficiency in installation or removal of the line member, while ensuring strength and rigidity of the upper frame.

This application is based on Japanese Patent application No. 2011-225986 filed in Japan Patent Office on Oct. 13, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An operating machine comprising:
a lower propelling body; and
a machine body mounted on the lower propelling body, wherein
the machine body includes an upper frame supported by the lower propelling body,
the upper frame supports a plurality of devices mutually connected by at least one line member and has a bottom plate; a pair of longitudinal plates each provided to stand on the bottom plate and extend in a front-rear direction, while being disposed in spaced-apart relation to each other in a right-left direction; and a transverse plate provided to stand on the bottom plate and extend in the right-left direction, while being joined to each of the longitudinal plates,
a specific plate consisting of at least one of the pair of longitudinal plates and the transverse plate separates the plurality of devices such that the line member traverses the specific plate, wherein the specific plate has an upper edge on which a pair of protrusions restricting movement of the line member in a specific direction in which the upper edge extends are provided to protrude upwardly from the upper edge, the upper edge being an upper terminal end of the specific plate, the pair of protrusions being separate from each other in the specific direction, to be opposed to each other, and the line member is set to pass through between the pair of protrusions, the operating machine further comprising a holding member adapted to be detachably fitted between the pair of protrusions, and a partition plate disposed on an upper side of the specific plate to partition a space above the upper frame, wherein:

the holding member has at least one through-hole and is adapted to hold the line member in a state in which the line member is penetratingly inserted into the through-hole, and the partition plate has a lower edge including a pair of first regions and a second region, the first regions being opposed to respective upper edges of the protrusions at respective positions just above the upper edges of the protrusions so as to prevent the holding member fitted between the pair of protrusions from disengagement from the pair of protrusions, the second region being opposed to the upper edge of the specific plate at a position just above the upper edge of the specific plate.

2. The operating machine as defined in claim 1, wherein the at least one line member includes a plurality of line members, the holding member has a plurality of through-holes as the at least one through-hole, the plurality of through-holes allowing the plurality of line members to be penetratingly inserted into respective ones thereof, and the holding member is adapted to hold the plurality of line members in a lump while being fitted between the pair of protrusions.

3. The operating machine as defined in claim 1, wherein the lower edge of the partition plate has a cutout formed in a specific region of the lower edge, the region being opposed to the pair of protrusions, the cutout having a shape extending along an outer line of the pair of protrusions.

4. The operating machine as defined in claim 3, wherein each of the pair of protrusions has a facing surface opposed to that of the counterpart, and an outer shirt surface provided on a side opposite to the facing surface, the outer shirt surface of each of the pair of protrusions inclines in a direction causing a distance from the facing surface of the protrusion to gradually increase toward a downward direction, and the cutout has an inner surface located in opposed relation to the outer skirt surfaces of the pair of protrusions, the inner surface having a shape which extends along the outer skirt surfaces of the pair of protrusions.

5. The operating machine as defined in claim 1, wherein the pair of protrusions are formed integrally with the specific plate, and the facing surface of each of the pair of protrusions has a perpendicular surface region located above the upper edge of the specific plate to extend perpendicularly with respect to the upper edge, and a curved surface region having a curve shape curved from a lower end of the perpendicular surface region in a direction causing a distance from the outer skirt surface of the protrusion to gradually increase toward a downward direction to be continuously connected to the upper edge of the specific plate.

6. The operating machine as defined in claim 1, wherein the pair of protrusions are formed as a member separate from the specific plate, and attached to the specific plate.

\* \* \* \* \*